(12) United States Patent
Knuckey et al.

(10) Patent No.: US 9,209,476 B2
(45) Date of Patent: Dec. 8, 2015

(54) FUEL CELLS

(75) Inventors: Kathryn Knuckey, Ormskirk (GB);
David Rochester, Hetton-le-Hole (GB);
Andrew Martin Creeth, Chester (GB)

(73) Assignee: ACAL ENERGY LIMITED, Runcorn, Cheshire (GB)

( * ) Notice: Subject to any disclaimer, the term of this patent is extended or adjusted under 35 U.S.C. 154(b) by 977 days.

(21) Appl. No.: 13/388,981

(22) PCT Filed: Aug. 5, 2010

(86) PCT No.: PCT/GB2010/051295
§ 371 (c)(1),
(2), (4) Date: May 18, 2012

(87) PCT Pub. No.: WO2011/015875
PCT Pub. Date: Feb. 10, 2011

(65) Prior Publication Data
US 2012/0231363 A1    Sep. 13, 2012

(30) Foreign Application Priority Data

Aug. 5, 2009 (GB) .................................. 0913638.3

(51) Int. Cl.
*H01M 8/10*      (2006.01)
*H01M 8/08*      (2006.01)
*H01M 8/18*      (2006.01)

(52) U.S. Cl.
CPC .............. *H01M 8/188* (2013.01); *Y02E 60/528* (2013.01)

(58) Field of Classification Search
None
See application file for complete search history.

(56) References Cited

U.S. PATENT DOCUMENTS 6,495,023 B1 * 12/2002 Zeikus et al. ................. 205/413

* cited by examiner

*Primary Examiner* — Susannah Chung
*Assistant Examiner* — Robert T Butcher
(74) *Attorney, Agent, or Firm* — Knobbe Martens Olson & Bear LLP

(57) ABSTRACT

The invention concerns the use as a redox a catalyst and/or mediator in a fuel cell catholyte solution of the compound of Formula (I) wherein: X is selected from hydrogen and from various functional groups; $R^{1-8}$ are independently selected from hydrogen and various functional groups; wherein $R^1$ and X and/or $R^5$ and X may together form an optionally substituted ring structure; wherein $R^1$ and $R^2$ and/or $R^2$ and $R^3$ and/or $R^3$ and $R^4$ and/or $R^4$ and $R^8$ and/or $R^8$ and $R^7$ and/or $R^7$ and $R^6$ and/or $R^6$ and $R^5$ may together form an optionally substituted ring structure; wherein (L) indicates the optional presence of a linking bond or group between the two neighboring aromatic rings of the structure, and when present may form an optionally substituted ring structure with one or both of $R^4$ and $R^8$; and wherein at least one substituent group of the structure is a charge-modifying substituent.

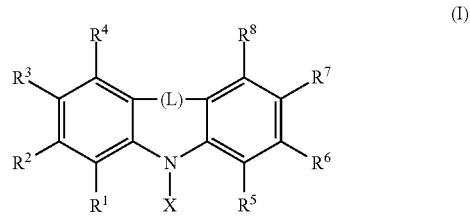

(I)

31 Claims, 4 Drawing Sheets

Figure 2: Cyclic voltammagram of 0.1M Fe(NO3)3 in 0.1M HNO3 with and without < 0.01M of N,N,N′,N′-tetrakis(4-sulfonatophenyl)-1,4-phenylenediamine (room temperature vs SCE).

Cyclic voltammagram of N,N,N',N'-tetra-(4-phenylsulfonato)-1,4-benzenediamine in water ($Na_2SO_4$ [0.1M] background electrolyte). Oxidation and reduction peak potentials of this compound are well placed for interaction with oxygen-reduction catalysts, and electrochemical reversibility is good compared to alternative mediator compounds.

N,N,N',N'-tetra-4-(phenylsulfonato)-1,4-benzenediamine (0.1M) in H$_2$SO4 (2.0M), 60°C no regeneration; chemical oxidation NaVO$_3$ (1.22 g 0.010 moles) (red). Data compared on identical system with current high performing catholyte composition (blue).

FUEL CELLS

CROSS-REFERENCE TO RELATED APPLICATIONS

This Application is the US National Phase under 35 U.S.C. §371 of International Application No. PCT/GB2010/051295, filed Aug. 5, 2010, which was published in English as International Publication No. WO 2011/015875 on Feb. 10, 2011, and claims the benefit of GB 0913638.3 filed Aug. 5, 2009.

BACKGROUND

1. Field

The present invention relates to fuel cells, in particular to indirect or redox fuel cells which have applications as power sources for: portable products such as portable electronics products; for transport vehicles such as automobiles, both main and auxiliary; auxiliary power for caravans and other recreational vehicles, boats etc; stationary uses such as uninterruptible power for mobile phone stations, hospitals, computer systems etc and combined heat and power for homes and businesses. The invention also relates to certain catholyte solutions for use in such fuel cells.

2. Description of the Related Art

Fuel cells have been developed for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, and air or oxygen as oxidant and the product of the reaction is water. The gases are fed respectively into catalysing, diffusion-type electrodes separated by a solid or liquid electrolyte which carries electrically charged species (eg protons or hydroxyl ions) between the two electrodes. In an indirect or redox fuel cell, the oxidant (and/or fuel in some cases) is not reacted directly at the electrode but instead reacts with the reduced form (oxidized form for fuel) of a redox couple to oxidise it, and this oxidised species is fed to the cathode (anode for fuel).

There are several types of fuel cell characterised by their different electrolytes. The liquid alkali electrolyte fuel cells have inherent disadvantages in that the electrolyte dissolves $CO_2$ and needs to be replaced periodically. Polymer electrolyte or PEM-type cells with proton-conducting solid cell membranes are acidic and avoid this problem. However, it has proved difficult in practice to attain power outputs from such systems approaching the theoretical maximum level, due to the relatively poor electrocatalysis of the oxygen reduction reaction.

In addition expensive noble metal electrocatalysts are often used. It would be preferable to use a less costly inert electrode, such as one formed of or coated with carbon, nickel or titanium. However, prior art cells in which inert electrodes have been utilised have produced unsatisfactory power output.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of mediators which undergo oxidation-reduction reactions in the catholyte solution. For example, U.S. Pat. No. 3,294,588 discloses the use of quinones and dyes in this capacity. However, despite the electrodes being coated with platinum, relatively low output was obtained during running of the cell. Another redox couple which has been tried is the vanadate/vanadyl couple, as disclosed in U.S. Pat. No. 3,279,949. In this case, the slow rate of reduction and oxidation of the vanadium couple reduces its performance. This problem is exacerbated by the insolubility of the vanadium couple. The same vanadium couple was used in U.S. Pat. No. 4,396,687.

According to U.S. Pat. No. 3,540,933, certain advantages could be realised in electrochemical fuel cells by using the same electrolyte solution for both catholyte and anolyte. This document discloses the use of a liquid electrolyte containing more than two redox couples therein, with equilibrium potentials not more than 0.8V apart from any other redox couple in the electrolyte.

The matching of the redox potentials of different redox couples in the electrolyte solution is also considered in U.S. Pat. No. 3,360,401, which concerns the use of an intermediate electron transfer species to increase the rate of flow of electrical energy from a fuel cell. The use of platinum coated electrodes is also disclosed.

U.S. Pat. No. 3,607,420 discloses an electrolyte in which the only soluble redox species present is the catalyst species. The electrolyte comprises a $Cu_{(I)}/Cu_{(II)}$ catalyst.

WO-A-2006/057387 discloses a bio fuel cell making use of a material which participates in the donation and receiving of electrons, the cell being said to exhibit an enhanced output power density. The material comprises an electron conductor of a specified external surface area, a redox polymer and a bio catalyst.

US-A-2003/0152823 discloses a fuel cell having an anode and a cathode with an anode enzyme disposed on the anode and a cathode enzyme disposed on the cathode.

US-A-2001/0028977 discloses a method for preparing a high energy density electrolyte solution for use in ore-vanadium redox cells.

Prior art fuel cells all suffer from one or more of the following disadvantages:

They are inefficient; they are expensive and/or expensive to assemble; they use expensive and/or environmentally unfriendly materials; they yield inadequate and/or insufficiently maintainable current densities and/or cell potentials; they are inefficient at heat dissipation; they require control of humidity by humidification of inlet gases, or modification of the stack assembly; they are too large in their construction; they operate at too high a temperature; they produce unwanted by-products and/or pollutants and/or noxious materials; they have not found practical, commercial utility in portable applications such as automotive and portable electronics.

SUMMARY

It is an object of the present invention to overcome or ameliorate one or more of the aforesaid disadvantages. It is a further object of the present invention to provide an improved catholyte solution for use in redox fuel cells.

A series of mediators which are suitable for use in redox fuel cells, based on transition metal complexes, including modified ferrocene species, has been disclosed in our PCT/GB2007/050421. However, modified ferrocenes have been observed to have redox couples in a limited potential window which limits exploitation of the full capabilities of the oxygen reduction reaction in such fuel cell systems.

According to the present invention there is provided the use as a redox a catalyst and/or mediator in a fuel cell catholyte solution of the compound of Formula (I):

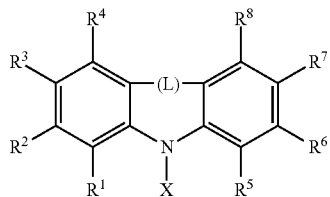

wherein:
X is selected from hydrogen and from functional groups comprising halogen, hydroxyl, amino, protonated amino, imino, nitro, cyano, acyl, acyloxy, sulphate, sulfonyl, sulfinyl, alkyamino, protonated alkylamino, quaternary alkylammonium, carboxy, carboxylic acid, ester, ether, amido, sulfonate, sulfonic acid, sulphonamide, phosphonic acid, phosphonate, phosphate, alkylsulfonyl, arylsulfonyl, alkoxycarbonyl, alkylsulfinyl, arylsulfinyl, alkylthio, arylthio, alkyl, alkoxy, oxyester, oxyamido, aryl, fused-aryl, arylamino, aryloxy, heterocycloalkyl, heteroaryl, fused-heteroaryl, $(C_2\text{-}C_5)$alkenyl, $(C_2\text{-}C_5)$alkynyl, azido, phenylsulfonyloxy, amino acid or a combination thereof;
$R^{1-8}$ are independently selected from hydrogen, halogen, hydroxyl, amino, protonated amino, imino, nitro, cyano, acyl, acyloxy, sulphate, sulfonyl, sulfinyl, alkyamino, protonated alkylamino, quaternary alkylammonium, carboxy, carboxylic acid, ester, ether, amido, sulfonate, sulfonic acid, sulphonamide, phosphonic acid, phosphonate, phosphate, alkylsulfonyl, arylsulfonyl, alkoxycarbonyl, alkylsulfinyl, arylsulfinyl, alkylthio, arylthio, alkyl, alkoxy, oxyester, oxyamido, aryl, fused-aryl, arylamino, aryloxy, heterocycloalkyl, heteroaryl, fused-heteroaryl, $(C_2\text{-}C_5)$alkenyl, $(C_2\text{-}0C_5)$alkynyl, azido, phenylsulfonyloxy, amino acid or a combination thereof;
wherein $R^1$ and X and/or $R^5$ and X may together form an optionally substituted ring structure;
wherein $R^1$ and $R^2$ and/or $R^2$ and $R^3$ and/or $R^3$ and $R^4$ and/or $R^4$ and $R^8$ and/or $R^8$ and $R^7$ and/or $R^7$ and $R^6$ and/or $R^6$ and $R^5$ may together form an optionally substituted ring structure; wherein
(L) indicates the optional presence of a linking bond or group between the two neighbouring aromatic rings of the structure, and when present may form an optionally substituted ring structure with one or both of $R^4$ and $R^6$; and wherein
at least one substituent group of the structure is a charge-modifying substituent.

By "charge-modifying substituent" is preferably meant that the effect of the substituent is to render the species non-neutral in its reduced form, preferably non-neutral in its non-reduced form.

The species is preferably soluble in polar solvents, more preferably soluble in aqueous solvents.

Preferably (L) when present is selected from O, N, S, imino, sulfonyl, sulfinyl, alkylamino, protonated alkylamino, quaternary alkylammonium, carbonyl, ester, ether, amido, sulphonamide, phosphonate, phosphate, alkysulfonyl, alkenylsulfonyl, arylsulfonyl, alkylsulfinyl, alkenylsulfinyl, arysulfinyl, alkylthio, alkenylthio, arylthio, oxyester, oxyamido, aryl, cycloalkyl, heteroaryl, $(C_2\text{-}C_5)$alkyl, $(C_2\text{-}C_5)$alkenyl, $(C_2\text{-}C_5)$alkynyl, or amino acid.

Preferred redox catalyst and/or mediators in accordance with the invention comprise a planar conjugated region extending beyond a single aromatic ring. These molecules will generally not be "truly planar" because they will be subject to rotational motion around non-fixed bonds in solution. However, the presence of at least a planar region may be important to achieve delocalisation of charge, which may be used for redox tailoring and radical charge stabilisation.

Particularly preferred compounds for use in accordance with the invention include:

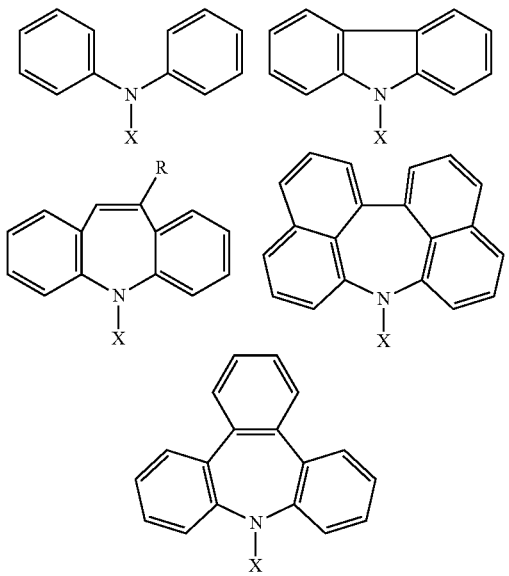

If the mediator species is to be used as a catholyte in a PEM cell comprising a cation exchange membrane, it will preferably be anionic in its oxidized form or, more preferably, anionic.

Anionic charge can be introduced to the mediator compound by providing that at least one of R and/or X (which have the same definitions as above for $R^{1-8}$ and X respectively), or at least one substituent group thereon, be an anionic charge inducing group such as carboxylate, phosphate or phosphonate groups. Stronger acid groups such as sulphonate and sulphate may also be introduced.

Alternatively, when the mediator species is to be used as a catholyte in a PEM cell comprising an anion exchange membrane, it will preferably be non-ionic in its reduced form, or more preferably, cationic.

Cationic charge can be introduced to mediator compounds by providing that at least one of $R^{1-8}$ and/or X, or at least one substituent group thereon, be a cationic charge inducing group such as a protonated amine or quaternary amine group.

Thus, it can be seen that the charge of the mediator compound of the present invention can be easily modified. This allows it to be tailored to the particular conditions of the cell with which it is to be used, such as increasing aqueous solubility as well as membrane compatibility. Additionally, modifications can be made to tailor the potential of the compound to the potential of the catholyte catalyst and the pH of the catholyte solution. To optimise the potential output of a given catholyte system, the cascade effect of electron transfer between catalyst and mediator should preferably be minimised. Changing the extent of the aromaticity and/or delocalisation, and/or the location of the electron modulating groups on the species can change redox potential better to match a catalyst with which it is deployed in use.

Certain preferred compounds in accordance with the invention are modified triphenylamine species wherein X may be represented by:

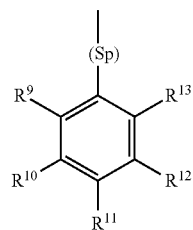

wherein $R^{9-13}$ are independently selected from hydrogen and from functional groups comprising halogen, hydroxy, amino, protonated amino, imino, nitro, cyano, acyl, acyloxy, sulphate, sulphonyl, sulphinyl, alkylamino, protonated alkylamino, quaternary alkylammonium, carboxy, carboxylic acid, ester, ether, amido, sulphonate, sulphonic acid, sulphonamide, phosphonic acid, phosphonate, phosphonic acid, phosphate, alkylsulphonyl, arylsulphonyl, alkoxycarbonyl, alkylsulphinyl, arylsulphinyl, alkylthio, arylthio, alkyl, alkoxy, oxyester, oxyamido, aryl, arylamino, aryloxy, heterocycloalkyl, heteroaryl, $(C_2-C_5)$alkenyl, $(C_2-C_5)$alkynyl, azido phenylsulphonyloxy or amino acid conjugates having the formula —CO—W—OH, where W is an amino acid, and from alkyl, alkenyl, aryl, cycloalkyl, alkaryl alkenaryl, aralkyl, aralkenyl groups substituted with one or more of the aforesaid functional groups; wherein
$R^9$ together with $R^1$ and/or $R^{13}$ together with $R^5$ may form a linking group or bond, preferably selected from $sp^2$ or $sp^3$ hybridised carbon, O, N, S, imino, sulfonyl, sulfinyl, alkylamino, protonated alkylamino, quaternary alkylammonium, carbonyl, ester, ether, amido, sulphonamide, phosphonate, phosphate, alkysulfonyl, alkenylsulfonyl arylsulfonyl, alkylsulfinyl, alkenylsulfinyl, arysulfinyl, alkylthio, alkenylthio, arylthio, oxyester, oxyamido, aryl, cycloalkyl, heteroaryl, $(C_2-C_5)$alkyl, $(C_2-C_5)$alkenyl, $(C_2-C_5)$alkynyl, or amino acid; and wherein
(Sp) indicates the optional presence of a spacer group, preferably selected from straight or branched chain and optionally substituted alkyl or alkenyl, or from optionally substituted aryl, cycloalkyl, alkaryl alkenaryl, aralkyl or aralkenyl, or from optionally substituted heterocyclic cycloalkyl, alkaryl alkenaryl, aralkyl, or aralkenyl.

The spacer group itself may when present play an important part in modulating the performance of the molecule for its designed purpose, because the spacer group may allow the designer of the mediator to select an appropriate three dimensional structure of the molecule and/or appropriate conjugation system in order to meet the demands o of a particular fuel cell environment. The functionality of the species may be affected by its physical properties as well as its electronic properties.

The or each functional group may therefore be terminated, or capped, with any suitable number of spacer element and/or further functional unit, for example alkyl, alkenyl, aryl, cycloalkyl, alkaryl, alkenaryl, aralkyl, aralkenyl, or heterocyclic, in which where appropriate any hydrocarbon chain may be straight or branched.

In the structures herein "alkyl" is preferably $C_{1-6}$ alkyl, for example $C_{2-6}$ alkyl, $C_{1-5}$ alkyl, $C_{2-5}$ alkyl, $C_{1-4}$ alkyl, $C_{2-4}$ alkyl, $C_{1-3}$ alkyl, $C_{2-3}$ alkyl or $C_{1-2}$ alkyl. The same $C_{number}$ ranges apply to alkenyl groups and to the alkyl or alkenyl parts of any aralkyl, aralkenyl, alkaryl or alkenaryl groups.

In particularly preferred embodiments of the invention, at least one of $R^{1-8}$, and or when present at least one of $R^{9-13}$ is selected from functional groups comprising —F, —CHO, —COCH$_3$, —COCH$_2$CH$_3$, —COCH$_2$CH$_2$COOH, —COOH, —(COOH)$_2$, —NH$_2$, —NH$_3^+$, —N(CH$_3$)$_2$, —NH(CH$_3$)$_2^+$, —N(CH$_3$)$_3^+$, —N(CH$_2$CH$_3$)$_2$, —NH(CH$_2$CH$_3$)$^+$, —N(CH$_2$CH$_3$)$_3^+$, quaternary amines with C(1) to C(4) alkyl chains, for example N(C4H9)$_3^+$, —CH$_2$N(CH$_3$)$_2$, —CH$_2$NH(CH$_3$)$_2^+$, —CH$_2$N(CH$_3$)$_3^+$, —N-(PhNH$_3^+$)$_2$, —N-(PhCH$_2$NH$_3^+$)$_2$, —N-(PhC$_2$H$_4$NH$_3^+$)$_2$, —N-(PhSO$_3$)$_2$, —N-(PhCH$_2$SO$_3^-$)$_2$, —PH—N-(PhNH$_3^+$)$_2$, —PH—N-(PhCH$_2$NH$_3^+$)$_2$, —PH—N-(PhC$_2$H$_4$NH$_3^+$)$_2$, —PH—N-(PhSO$_3^-$)$_2$, —PH—N-(PhCH$_2$SO$_3$)$_2$, —PH—N-(PhC$_2$H$_4$SO$_3$)$_2$, —OH, —CH$_2$OH, —CH(OH)CH$_3$, —OSO$_3^-$, —SO$_3^-$, —CH$_2$SO$_3^-$, —CH$_2$OSO$_3^-$, —PO(OH)$_2$, —OPO(OH)$_2$, —CO-Gly-OH, —CO-Glu-OH or —CO-Asp-OH, and from alkyl, alkenyl, aryl, cycloalkyl, alkaryl alkenaryl, aralkyl, aralkenyl groups substituted with one or more of the aforesaid functional groups.

It has surprisingly been found that the compounds of the invention in general, and the modified triphenylamine species in particular, have the required properties to function effectively as redox couples in catholytes, and can display redox behaviour in a potential window more suitable in some circumstances than ferrocene derivatives. Mediator compounds such as triphenylamine and many of its derivatives are not directly suitable for use in certain catholyte systems as they are of neutral charge in their reduced form, insufficiently soluble, may become positively charged upon formation of the oxidised/radical species, and may exhibit potentio-dynamic electropolymerisation in solution. For example, triphenylamine itself operates at a potential window too high for operation as a mediator in most catholyte systems, which makes them unsuitable for use in PEM cells including cation exchange membranes, such as Nafion® membranes.

However we have found that certain chemical modifications of triphenylamine, and similar compounds will improve its aqueous solubility, limit electropolymerisation effects and allow the charge and potential of operation of the species to be manipulated. Thus, if the mediator compound is to be used as a catholyte in a PEM cell comprising a cation exchange membrane, it will be preferably be non-ionic in its oxidized form or, more preferably, anionic.

Also according to the invention there is provided a catholyte for use in a redox fuel cell, the catholyte comprising at least the aforesaid redox mediator species together with a suitable catalyst. The concentration of the redox mediator species in the catholyte solution is preferably at least about 0.0001M, more preferably at least about 0.005M, even more preferably at least about 0.001M, still more preferably at least about 0.01M and most preferably at least about 0.1M.

Particularly preferred modified triphenylamine compounds for use in the fuel cells of the invention include:

The redox mediator compounds of the invention are intended for use in redox fuel cells. Accordingly, the present invention provides a redox fuel cell comprising:

a membrane electrode assembly comprising an anode and a cathode separated by an ion selective polymer electrolyte membrane;
an anode chamber adjacent the anode of the membrane electrode assembly;
a cathode chamber adjacent the cathode of the membrane electrode assembly;
means for supplying a fuel to the anode chamber of the cell;
means for supplying an oxidant to the cell;
means for providing an electrical circuit between the anode and the cathode of the cell; and
a catholyte solution comprising at least one non-volatile catholyte component, the catholyte solution comprising the redox mediator species of the invention.

Commonly, the fuel cell will comprise a plural stack of membrane electrode assemblies. Consequently, the invention also provides a redox fuel cell comprising:

a plural stack of membrane electrode assemblies, each membrane electrode assembly comprising an anode and a cathode separated by an ion selective polymer electrolyte membrane;
an anode chamber adjacent the anode of each membrane electrode assembly;
a cathode chamber adjacent the cathode of each membrane electrode assembly;
means for supplying a fuel to the anode chambers of the cell;
means for supplying an oxidant to the cell;
means for providing an electrical circuit between respective anodes and cathodes of the cell;
a catholyte solution comprising at least one non-volatile catholyte component, the catholyte solution comprising the redox mediator species of the invention.

The catholyte solution will, as intimated above, typically comprise a suitable redox catalyst in addition to the redox mediator species of the invention. Therefore, the invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a catholyte solution comprising at least one non-volatile catholyte component flowing in fluid communication with the cathode, the catholyte solution comprising a electron-transfer mediator of Formula (I) which is at least partially reduced at the cathode in operation of the cell, and at least partially regenerated by, optionally indirect, reaction with the oxidant after such reduction at the cathode, and a redox catalyst catalysing the regeneration of the mediator.

Also provided in accordance with the invention is a method for operating a redox fuel cell comprising:

Providing a membrane electrode assembly comprising an anode and a cathode separated by an ion selective polymer electrolyte membrane;
providing an anode chamber adjacent the anode of the membrane electrode assembly;
providing a cathode chamber adjacent the cathode of the membrane electrode assembly;
supplying a fuel to the anode chamber of the cell;
supplying an oxidant to the cell;
providing an electrical circuit between the anode and the cathode of the cell; and
providing a catholyte solution comprising at least one non-volatile catholyte component, the catholyte solution comprising the redox mediator species of the invention.

In one preferred embodiment of the invention, the ion selective PEM is a cation selective membrane which is selective in favour of protons versus other cations. In cases where the PEM is a cation selective membrane, the pH of the catholyte is preferably below 7, more preferably below 4, even more preferably below 2 and most preferably below 1.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulphonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin type ion exchange resins include polyvinyl alcohols, polyalkylene oxides, styrenedivinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytrifluorostyrene sulphonic, sulphonated trifluorostyrene, sulphonated copolymers based on $\alpha,\beta,\beta$-trifluorostyrene monomer, radiation-grafted membranes. Non-fluorinated membranes include sulphonated poly(phenylquinoxalines), poly (2,6-diphenyl-4-phenylene oxide), poly(arylether sulphone), poly(2,6-diphenylenol); acid-doped polybenzimidazole, sulphonated polyimides; styrene/ethylenebutadiene/styrene triblock copolymers; partially sulphonated polyarylene ether sulphone; partially sulphonated polyether ether ketone (PEEK); and polybenzyl suphonic acid siloxane (PBSS).

However, fuel cells of the present invention are not limited to use with only cationic selective polymer electrode membranes. Anionic selective polymer electrode membranes may also be used in the fuel cell of the present invention. Suitable examples of anionic membranes include quaternary amine derivatives of styrene cross-linked with divinyl benzene and polymerised in the presence of finely powdered polyvinyl chloride to provide strength.

In embodiments in which the polymer electrode membrane is anion specific, it is preferred that the catholyte solution have a pH of above 7. In a more preferred embodiment, the catholyte has a pH of above 8.

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bimembrane may comprise at least two discreet membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution in the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials other than protons from passing therethrough from the cathode side to the anode side thereof. In this case protons may pass from anode to cathode.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprise one or more perforations in the cation selective membrane, allowing such flushing directly through the membrane. Alternatively means may be provided for channelling flushed materials around the cation selective membrane from the interstitial space to the cathode side of the said membrane.

A representative example of a useful bipolar membrane, the arrangement used with the anionic-selective membrane on the anode side is that sold under the trademark Neosepta® BP-1, available from Tokuyama Corporation.

According to another aspect of the present invention, there is provided a method of operating a proton exchange membrane fuel cell comprising the steps of:
a) forming ions at an anode situated adjacent to a proton exchange membrane;
b) supplying the catholyte of the invention with its redox mediator species in an oxidised state to a cathode situated oppositely adjacent to the proton exchange membrane; and
c) allowing the modified redox mediator species to become reduced upon contact with the cathode concomitantly with $H_+$ ions passing through the membrane to balance charge.

In another embodiment, the catholyte is supplied from a catholyte reservoir.

The method of the above aspect may additionally comprise the step of:
d) passing the catholyte from the cathode to a reoxidation zone wherein the modified redox mediator species is reoxidised by the catalyst reacting with the oxidant.

In another embodiment, the method of the above aspect comprises the step of:
e) passing the catholyte from the reoxidation zone to the catholyte reservoir.

In this embodiment, the cell is cyclic and the redox mediator molecule in the cathode can be repeatedly oxidised and reduced without having to be replaced.

An electricity loading device configured to load an electric power may also be provided in association with the fuel cell of the invention.

The fuel cell of the invention may comprise a reformer configured to convert available fuel precursor such as LPG, LNG, gasoline or low molecular weight alcohols into a fuel gas (eg hydrogen) through a steam reforming reaction. The cell may then comprise a fuel gas supply device configured to supply the reformed fuel gas to the anode chamber.

Preferred fuels include hydrogen; metal hydrides, for example borohydride which may act as a fuel itself or as a provider of hydrogen, low molecular weight alcohols, aldehydes and carboxylic acids, sugars and biofuels as well as LPG, LNG or gasoline.

Preferred oxidants include air, oxygen and peroxides.

The anode in the redox fuel cell of the invention may for example be a hydrogen gas anode or a direct methanol anode; other low molecular weight alcohols such as ethanol, propanol, dipropylene glycol; ethylene glycol; also aldehydes formed from these and acid species such as formic acid, ethanoic acid etc. In addition the anode may be formed from a bio-fuel cell type system where a bacterial species consumes a fuel and either produces a mediator which is oxidized at the electrode, or the bacteria themselves are adsorbed at the electrode and directly donate electrons to the anode. The cathode in the redox fuel cell of the invention may comprise as cathodic material carbon, gold, platinum, nickel, metal oxide species. However, as a result of the advantageous catholyte of the present invention, the use of such cathodes is not necessary to achieve satisfactory power output. Thus, the preferred cathodic materials include carbon, nickel, titanium and other metals inert in the specific catholyte and metal oxide or sulphide. One preferable material for the cathodes is reticulated vitreous carbon or carbon fibre based electrodes such as carbon felt. Another is nickel foam or mesh, or titanium foam or mesh. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode.

The redox mediator species flowing in solution in the cathode chamber in operation of the cell is used in the invention as a mediator which acts as an electron sink for electrons formed during the fuel cell reaction. Following this reduction of the mediator, it is reoxidised by the catalyst reacting with the oxidant.

The redox mediator species, and any catalyst redox couple, utilised in the fuel cell of the invention should be non-volatile, and be preferably soluble in aqueous solvent. Preferred catalyst couple species should react with the oxidant at a rate effective to generate a useful current in the electrical circuit of the fuel cell, and react with the oxidant such that water is the ultimate end product of the reaction.

The fuel cell of the invention requires the presence of at least about 0.0001M of a redox mediator species in the catholyte solution. However, catalyst redox couples should be included in the catholyte solution in addition to the redox mediator species. There are many suitable examples of such catalyst redox couples, including ligated transition metal complexes and polyoxometallate species. Specific examples of polyoxometallate catalyst species which are useful in the fuel cell of the present invention are disclosed in the co-pending UK patent application, GB 0605878.8. Specific examples of suitable transition metals ions which can form such complexes include manganese (II-V), iron (I-IV), copper (I-III), cobalt (I-III), nickel (I-III), chromium (II-VII), titanium (II-IV), tungsten (IV-VI), vanadium (II-V) and molybdenum (II-VI). Ligands for ligated transition metal complexes can contain carbon, hydrogen, oxygen, nitrogen, sulphur, halides and/or phosphorus. Ligands may be chelating including EDTA, for example bound to iron or manganese metal centres, NTA, 2-hydroxyethylenediaminetriacetic acid, or non-chelating such as cyanide.

Alternative catalysts which may be useful in the present invention are complexes of multidentate N-donor ligands. Such ligands are described in GB publication number GB2440435 and may be coordinated with any suitable metal or metals, for example transition metals. Examples of such N donor ligands can be selected from N4Py and derivatives thereof, pydien or derivatives thereof, and trilen and tpen and derivatives thereof. Iron complexes of these example N-donors are found to be effective catalysts for the oxidation of redox mediators in fuel cell systems. Further examples of suitable N-donor ligands can be selected from WO2009/050067 which describes a series of multidentate macrocyclic N-donor type ligands; particular reference is made to the following structures and examples 1-4 of WO2009/050067, which are incorporated herein by reference:

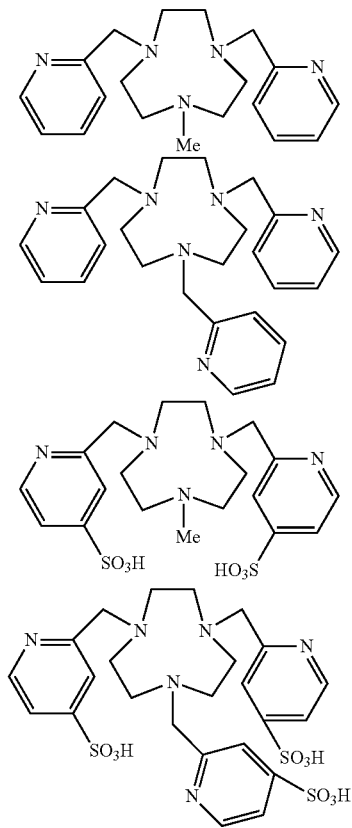

BRIEF DESCRIPTION OF THE DRAWINGS

Various aspects of the present invention will now be more particularly described with reference to the following figures which illustrate embodiments of the present invention.

DETAILED DESCRIPTION

Figure 1:
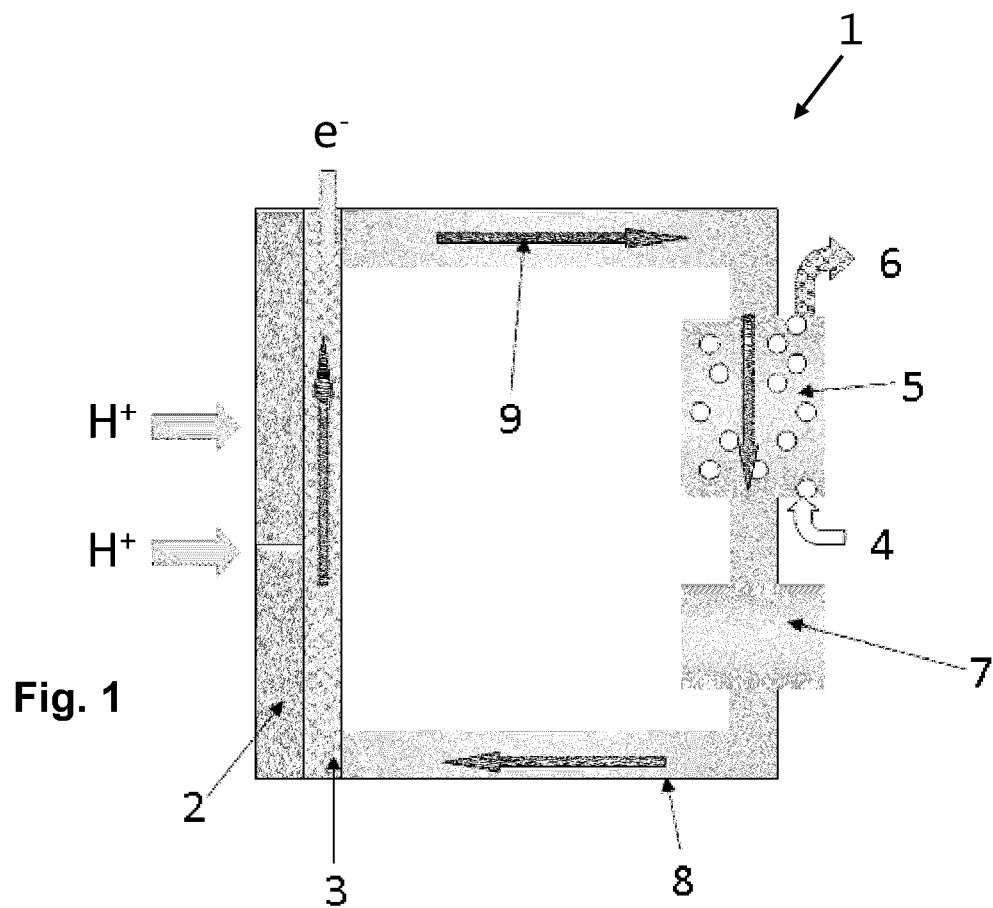
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. Polymer electrolyte membrane 2 comprises cation selective Nafion 112 membrane through which protons generated by the (optionally catalytic) oxidation of fuel gas (in this case hydrogen) in the anode chamber pass in operation of the cell. Of course, the skilled person would understand that other membranes may be equally applicable and fall within the scope of the present invention. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the byproducts of the fuel cell reaction (eg water and heat) can be discharged.

A catholyte solution comprising a catalyst and the oxidised form of the redox mediator species is supplied in operation of the cell from catholyte reservoir 7 into the cathode inlet channel 8. The catholyte passes into reticulated carbon cathode 3, which is situated adjacent membrane 2. As the catholyte passes through cathode 3, the redox mediator species and catalyst are reduced and are then returned to cathode gas reaction chamber 5 via cathode outlet channel 9.

Due to the advantageous composition of the catholyte of the present invention, reoxidation of the redox mediator species and the catalyst occurs very rapidly, which allows the fuel cell to produce a higher sustainable current than with catholytes of the prior art.

The following non-limiting example more particularly describes the invention.

Example 1

A standard three electrode cell having (a) a 0.5 cm² glassy carbon electrode, (b) a reference calomel electrode (SCE) with a luggin capillary placed with the end about 2 mm away from the electrode, and (c) a platinum counter electrode was set up.

Figure 2:
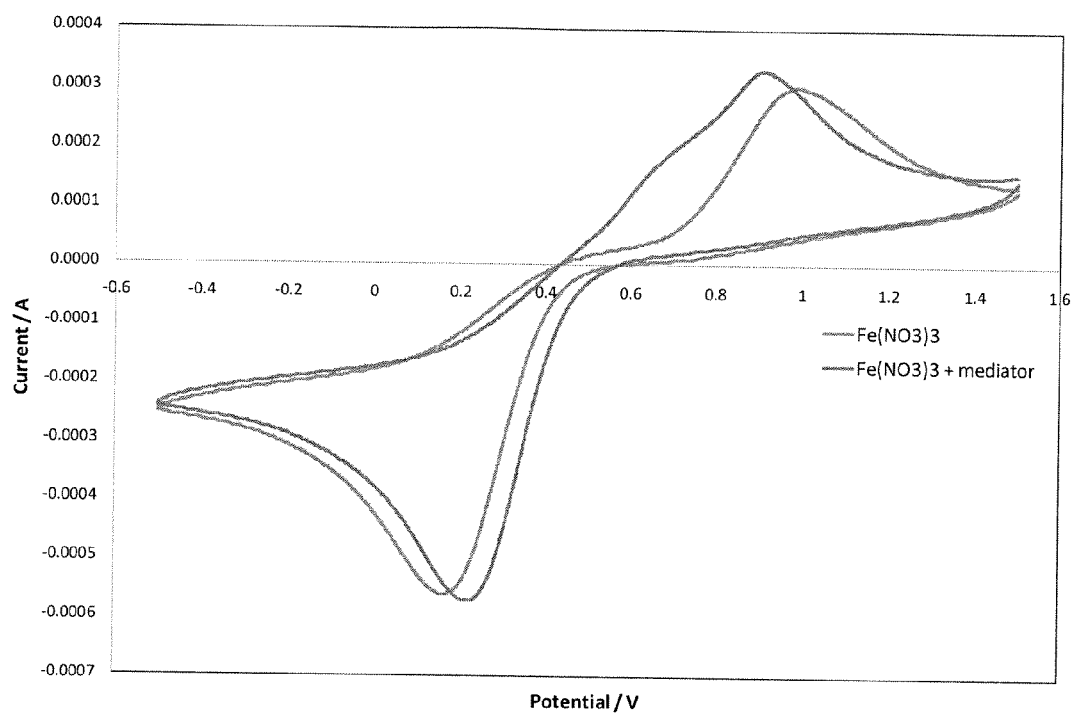
FIG. 2 shows a chart showing mediation of an Fe(II)/(III) couple by a modified triphenylamine species.

A cyclic voltammogram (shown in FIG. 2) was ran at 50 mV/s at room temperature to compare the behaviour of two catholyte solutions. The first catholyte included 0.1M $Fe(NO_3)_3$ in 0.1M $HNO_3$. The second catholyte also included in addition a modified mediator species of the present invention, N,N,N',N'-tetrakis(4-sulfonatophenyl)-1,4-phenylenediamine, having the structure:

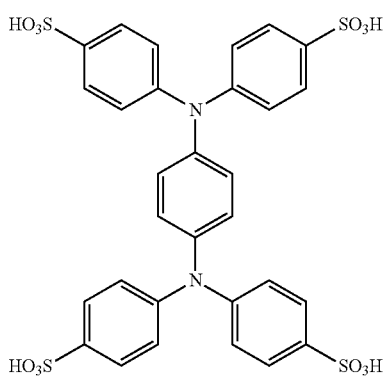

The Nernst potential of the first catholyte solution is 0.81V vs NHE, 0.57 V vs SCE. The poor kinetics of the iron couple ($Fe_{(II)}/Fe_{(III)}$) are highlighted, as can be seen from FIG. 2, as significant reduction current does not occur until the potential reaches around 0.3 V vs SCE reaching a peak at about 0.17V vs SCE. However, in the presence of the redox mediator compound, the current rises at around 0.5 V vs SCE to give a peak above 0.2 V vs SCE.

Example 2

Synthesis

Synthesis of sulfonated triarylamine derivatives can be achieved by treating triarylamines with sulfur trioxide-N,N-dimethylformamide complex, as a sulfonated reagent, in anhydrous DMF. Of course, the skilled person will appreciate that other sulfonating agents may be used in the same capacity as described above. Products were purified by a combination of washing the aqueous dissolved products with organic solvents follow by reversed-phase chromatography with RP-C18 silica gel eluted with water/acetonitrile developing solvent.

Electrochemistry

The useful redox properties of triarylamines have seen them heavily researched for exploitation in the fields such as organic electronics. Control over properties such as redox potential, reversibility of the electrode dynamics and side reactions of redox states can all be achieved through a number of different choices made about the molecular architecture.

Figure 3:
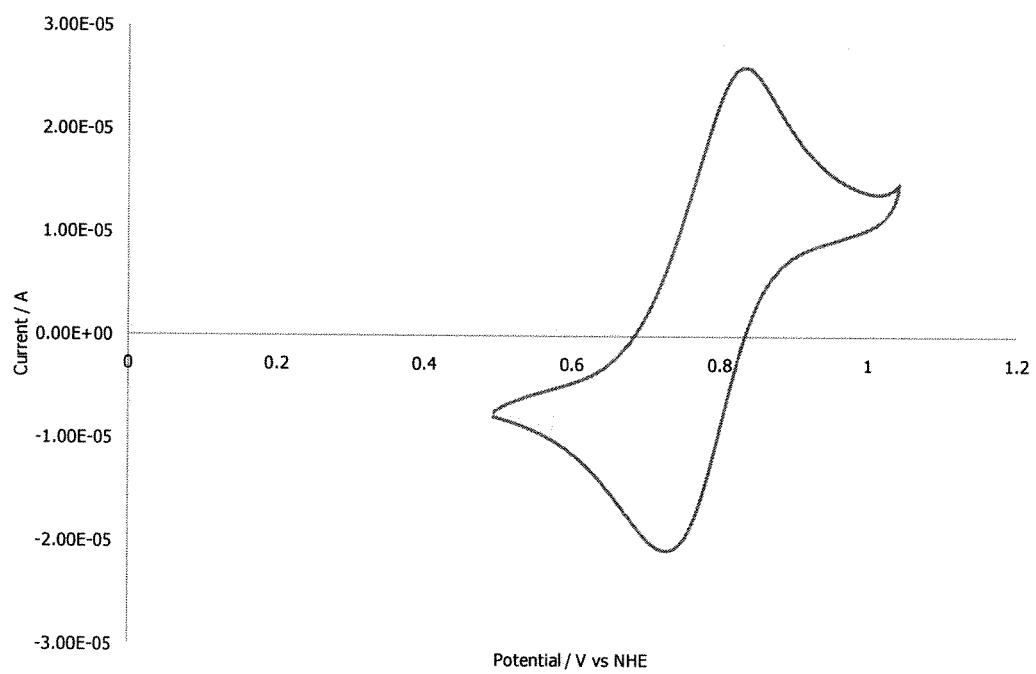
FIG. 3 illustrates a cyclic voltammagram of N,N,N',N'-tetra-(4-phenylsulfonato)-1,4-benzenediamine in water ($Na_2SO_4$ [0.1M] background electrolyte)

The redox potential and electrode dynamics of aromatic amines can be controlled and tailored to a desired performance, as seen in FIG. 3. The data of Table 1 supports that electron donor/acceptor functionalisation of the triarylamines increases/decreases redox potentials. In addition, controlling the differences in solvation of the redox states of these compounds contribute to the degree of reversibility of the electrochemical processes, $\Delta E$.

TABLE 1

| Compound | $E^{ox}$ | $E^{red}$ | $E^{1/2}$ | $\Delta E$ | Current Ratio |
|---|---|---|---|---|---|
| Triphenylamine[a] | >1.4 | 1.148 | 1.27 | — | — |
| Tri-p-tolylamine[a] | 1.305 | 0.863 | 1.08 | 0.442 | 63% |
| 1,4-Bis-(diphenylamino)benzene[a] | 1.103 | 0.622 | 0.863 | 0.481 | 67% |
| 1,3,4-Tris-(diphenylamino)benzene[a] | 1.325 | 1.026 | 0.299 | 0.299 | 6% |
| 9-Phenylcarbazole[a] | >1.6 | — | — | — | — |

TABLE 1-continued

| Compound | $E^{ox}$ | $E^{red}$ | $E^{1/2}$ | $\Delta E$ | Current Ratio |
|---|---|---|---|---|---|
| N,N,N',N'-Tetra-(4-phenylsulfonato)-1,4-benzenediamine[b] | 0.835 | 0.731 | 0.783 | 0.104 | 91% |

$E^{ox}$ = oxidation potential (vs NHE); $E^{red}$ (reduction peak potential vs NHE); $E^{1/2}$ = Nernst potential (vs NHE); $\Delta E$ = oxidation and reduction wave peak separation; peak current ratio ($i_{oxidation}/i_{reduction}$) × 100.
[a] 0.01M in DCM; 0.1M $Bu_4NClO_4$; RT; air atmosphere; 100 mV/s; glassy carbon working electrode; platinum wire counter electrode; recorded with reference to SCE mathematically corrected to NHE.
[b] 0.01M in water; 0.1M $Na_2SO_4$; RT; air atmosphere; 100 mV/s; glassy carbon working electrode; platinum wire counter electrode; recorded with reference to SCE mathematically corrected to NHE.

Fuel Cell Data

Figure 4:
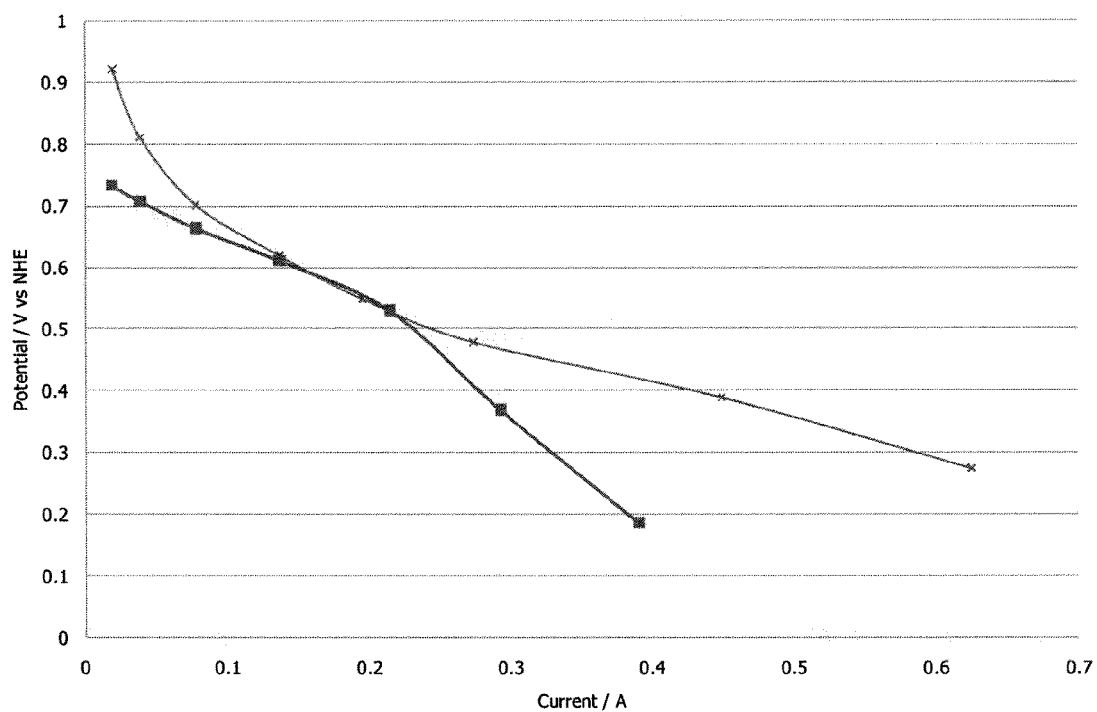
FIG. 4 shows a chart of fuel data collected from an oxidized sample of N,N,N',N'-tetra-4-(phenylsulfonato)-1,4-benzenediamine (0.1M) in $H_2SO_4$ (2.0M) at 60° C. with no regeneration.

Sufficient sulfonation of aromatic amines creates an anionic molecule capable of passive interaction with the proton exchange membrane used in ACAL Energy's Flowcath® technology. It is commonly understood that excessive cations in the catholyte composition will be detrimental to the proton conductivity of the membrane, and therefore, fuel cell performance will greatly suffer. Comparative electrode data with existing catholyte systems show promising results at concentrations that are not optimised, as seen in FIG. 4, with obvious scope for significant improvements from early test data.

N,N,N',N'-tetra-(4-sulfonatophenyl)-1,4-benzenediamine is not oxidised by air alone, but forms the electron transfer mediator part of a catholyte composition. Therefore, the compound was chemically oxidised by addition of $NaVO_3$ to an aqueous solution of the mediator to generate the oxidised material required for electrode testing in the fuel cell.

The invention claimed is:
1. A fuel cell catholyte solution, comprising:
at least one non-volatile catholyte component;
a redox mediator species compound of Formula (I):

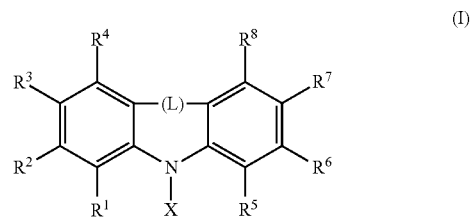

(I)

wherein:
X is:

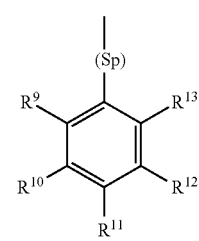

wherein each of $R^9$-$R^{13}$ is independently selected from the group consisting of hydrogen and functional groups comprising halogen, hydroxy, amino, protonated amino, imino, nitro, cyano, acyl, acyloxy, sulphate, sulphonyl, sulphinyl, alkylamino, protonated alkylamino, quaternary alkylammonium, carboxy, carboxylic acid, ester, ether, amido, sulphonate, sulphonic acid, sulphonamide, phosphonic acid, phosphonate, phosphonic acid, phosphate, alkylsulphonyl, arylsulphonyl, alkoxycarbonyl, alkylsulphinyl, arylsulphinyl, alkylthio, arylthio, alkyl, alkoxy, oxyester, oxyamido, aryl, arylamino, aryloxy, heterocycloalkyl, heteroaryl, (C2-C5)alkenyl, (C2-C5) alkynyl, azido phenylsulphonyloxy or amino acid conjugates having the formula —CO—W—OH where W is an amino acid and from alkyl, alkenyl, aryl, cycloalkyl, alkaryl, alkenaryl, aralkyl, aralkenyl groups substituted with one or more of the aforesaid functional groups; and wherein (Sp) is absent or is a spacer group, each of $R^1$-$R^8$ is independently selected from the group consisting of hydrogen, halogen, hydroxyl, amino, protonated amino, imino, nitro, cyano, acyl, acyloxy, sulphate, sulfonyl, sulfinyl, alkyamino, protonated alkylamino, quaternary alkylammonium, carboxy, carboxylic acid, ester, ether, amido, sulfonate, sulfonic acid, sulphonamide, phosphonic acid, phosphonate, phosphate, alkylsulfonyl, arylsulfonyl, alkoxycarbonyl, alkylsulfinyl, arylsulfinyl, alkylthio, arylthio, alkyl, alkoxy, oxyester, oxyamido, aryl, fused-aryl, arylamino, aryloxy, heterocycloalkyl, heteroaryl, fused-heteroaryl, $(C_2-C_5)$alkenyl, $(C_2-C_5)$alkynyl, azido, phenylsulfonyloxy, amino acid or combinations thereof;

wherein (L) indicates the optional presence of a linking bond or group between neighbouring aromatic rings of the compound of Formula (I); and wherein at least one of $R^1$-$R^8$ and/or X, or at least one substituent group of $R^1$-$R^8$ and/or X of the compound of Formula (I), is a charge-modifying substituent; and a redox catalyst for catalyzing regeneration of the mediator.

2. The fuel cell catholyte solution of claim 1 wherein the compound of Formula (I) is non-neutral when in a reduced form.

3. The fuel cell catholyte solution of claim 1 wherein the compound of Formula (I) is non-neutral when in a non-reduced form.

4. The fuel cell catholyte solution of claim 1 wherein the compound of Formula (I) is soluble in a polar solvent.

5. The fuel cell catholyte solution of claim 4 wherein the compound of Formula (I) is soluble in an aqueous solvent.

6. The fuel cell catholyte solution of claim 1 wherein (L) is selected from the group consisting of a linking bond, an $sp^2$ or $sp^3$ hybridised carbon, O, N, S, imino, sulfonyl, sulfinyl, alkylamino, protonated alkylamino, quaternary alkylammonium, carbonyl, ester, ether, amido, sulphonamide, phosphonate, phosphate, alkysulfonyl, alkenylsulfonyl, arylsulfonyl, alkylsulfinyl, alkenylsulfinyl, arysulfinyl, alkylthio, alkenylthio, arylthio, oxyester, oxyamido, aryl, cycloalkyl, heteroaryl, $(C_2-C_5)$alkyl, $(C_2-C_5)$alkenyl, $(C_2-C_5)$alkynyl, and amino acid.

7. The-fuel cell catholyte solution of claim 1 wherein the compound of Formula (I) comprises a region of electron delocalisation extending beyond a single aromatic ring.

8. The fuel cell catholyte solution of claim 1 wherein the compound of Formula (I) is selected from the group consisting of:

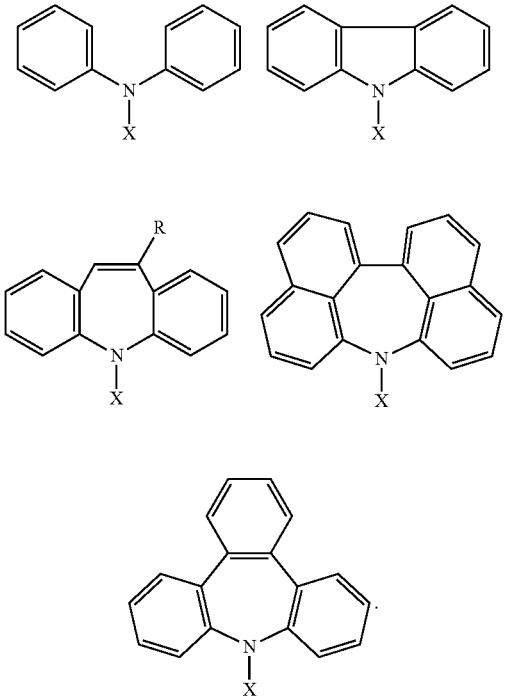

9. The fuel cell catholyte solution according to claim 1 comprising a spacer group (Sp) selected from the group consisting of straight and branched chain, optionally substituted alkyl and alkenyl, optionally substituted aryl, cycloalkyl, alkaryl alkenaryl, aralkyl, and aralkenyl, and optionally substituted heterocyclic cycloalkyl, alkaryl alkenaryl, aralkyl, and aralkenyl.

10. The fuel cell catholyte solution of claim 1 wherein one or more functional groups is terminated with one or more of spacer elements and functional groups.

11. The fuel cell catholyte solution according to claim 10 wherein the spacer elements and functional groups are independently selected from the group consisting of straight and branched alkyl, alkenyl, aryl, cycloalkyl, alkaryl, alkenaryl, aralkyl, aralkenyl, and heterocyclic units.

12. The fuel cell catholyte solution of claim 1 wherein at least one of $R^1$-$R^8$ is selected from the group consisting of (i) functional groups comprising —F, —CHO, —$COCH_3$, —$COCH_2CH_3$, —$COCH_2CH_2COOH$, —COOH, —$(COOH)_2$, —$NH_2$, —$NH_3^+$—$N(CH_3)_2$, —$NH(CH_3)_2^+$, —$N(CH_3)_3^+$, —$N(CH_2CH_3)_2$, —$NH(Ch_2Ch_3)^+$, —$N(CH_2CH_3)_3^+$, —$CH_2N(CH_3)_2$, —$CH_2NH(CH_3)_2^+$, —$CH_2N(CH_3)_2^+$, —N-$(PhNH_3^+)_2$, —N-$(PhCH_2NH_3^+)_2$, —N-$(PhC_2H_4NH_3^+)_2$, —N-$(PhSO_3^-)_2$, —N-$(PhCH_2SO_3^-)_2$, —PH—N-$(PhNH_3^+)_2$, —PH—N-$(PhCH_2NH_3^+)_2$, —PH—N-$(PhC_2H_4NH_3^+)_2$, —PH—N-$(PhSO_3)_2$, —PH—N-$(PhCH_2SO_3^-)_2$, —PH—N-$(PhC_2H_4SO_3^-)_2$, —OH, —$CH_2OH$, —$CH(OH)CH_3$, —$OSO_3^-$, —$SO_3^-$, —$CH_2SO_3^-$, —$CH_2OSO_3^-$, —$PO(OH)_2$, —$OPO(OH)_2$, —CO-Gly-OH, —CO-Glu-OH and —CO-Asp-OH, and (ii) any of alkyl, alkenyl, aryl, cycloalkyl, alkaryl alkenaryl, aralkyl, and aralkenyl groups substituted with one or more of the aforesaid functional groups.

13. The fuel cell catholyte solution of claim 1 wherein the compound of Formula (I) is selected from the group consisting of:
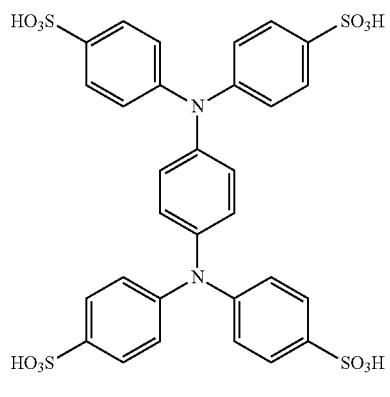
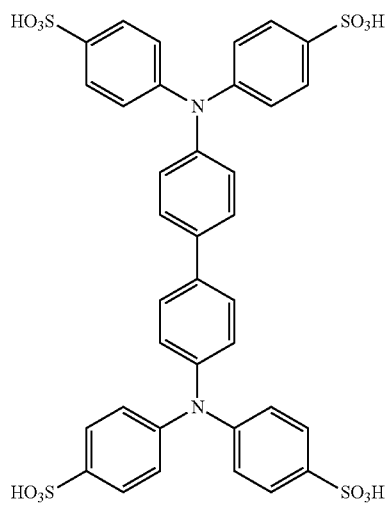
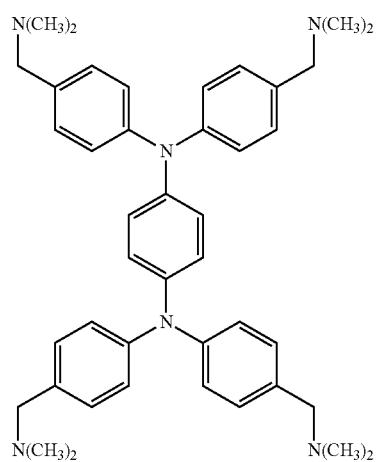
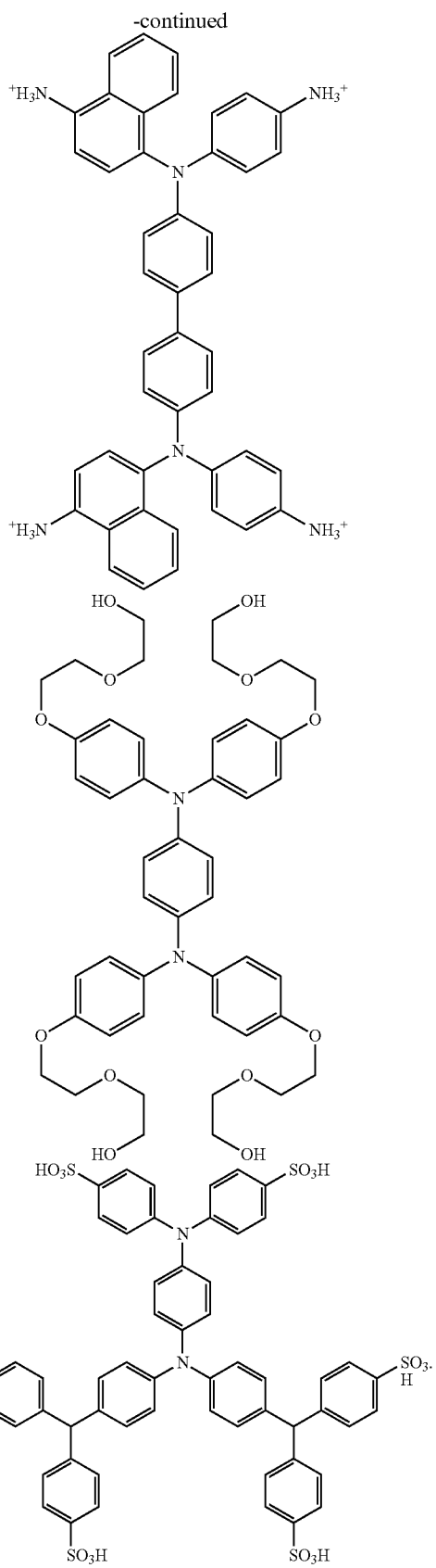
14. A redox fuel cell comprising the fuel cell catholyte solution of claim 1, a cathode, and an anode.

15. The fuel cell catholyte solution according to claim 1 wherein the redox catalyst is selected from the group consisting of N-donor compounds and polyoxometallate species.

16. A redox fuel cell comprising:
a membrane electrode assembly comprising an anode and a cathode separated by an ion selective polymer electrolyte membrane;
an anode chamber adjacent to the anode of the membrane electrode assembly;
a cathode chamber adjacent to the cathode of the membrane electrode assembly;
a fuel passage through which fuel is supplied to the anode chamber of the cell;
an oxidant inlet that supplies an oxidant to the cell;
an electrical circuit between the anode and the cathode of the cell; and
a catholyte solution according to claim 1.

17. A redox fuel cell according to claim 16 comprising:
a plural stack of said membrane electrode assemblies.

18. The redox fuel cell according to claim 16, wherein the redox mediator of the compound of Formula (I) is at least partially reduced at the cathode in operation of the cell, and at least partially regenerated by reaction with the oxidant after such reduction at the cathode.

19. The redox fuel cell according to claim 16 wherein the ion selective polymer electrode membrane is one or more of cation selective and proton selective.

20. The redox fuel cell according to claim 19 wherein the catholyte solution is acidic.

21. The redox fuel cell according to claim 19 wherein the compound of Formula (I) is one of non-ionic and anionic when in an oxidized form.

22. The redox fuel cell according to claim 16 wherein the ion selective polymer electrode membrane is anion selective.

23. The redox fuel cell according to claim 22 wherein the catholyte solution is alkali.

24. The redox fuel cell according to claim 22 wherein the compound of Formula (I) is one of non-ionic and anionic when in a reduced form.

25. A method for operating a redox fuel cell comprising:
providing a membrane electrode assembly comprising an anode and a cathode separated by an ion selective polymer electrolyte membrane;
providing an anode chamber adjacent to the anode of the membrane electrode assembly;
providing a cathode chamber adjacent to the cathode of the membrane electrode assembly;
supplying a fuel to the anode chamber of the cell;
supplying an oxidant to the cell;
providing an electrical circuit between the anode and the cathode of the cell; and
providing a catholyte solution according to claim 1.

26. The fuel cell catholyte solution of claim 1, wherein one or more of $R^1$ and X and $R^5$ and X together form an optionally substituted ring structure.

27. The fuel cell catholyte solution of claim 1 wherein one or more of $R^1$ and $R^2$, $R^2$ and $R^3$, $R^3$ and $R^4$, $R^4$ and $R^8$, $R^8$ and $R^7$, $R^7$ and $R^6$, and $R^6$ and $R^5$ form an optionally substituted ring structure.

28. The fuel cell catholyte solution of claim 7, wherein the region of electron delocalization comprises a planar conjugated region.

29. The fuel cell catholyte solution of claim 1, wherein one or more of $R^9$ together with $R^1$ and $R^{13}$ together with $R^5$ form a linking group, selected from the group consisting of O, N, S, imino, sulfonyl, sulfinyl, alkylamino, protonated alkylamino, quaternary alkylammonium, carbonyl, ester, ether, amido, sulphonamide, phosphonate, phosphate, alkysulfonyl, alkenylsulfonyl, arylsulfonyl, alkylsulfinyl, alkenylsulfinyl, arysulfinyl, alkylthio, alkenylthio, arylthio, oxyester, oxyamido, aryl, cycloalkyl, heteroaryl, $(C_2-C_5)$alkyl, $(C_2-C_5)$alkenyl, $(C_2-C_5)$alkynyl, and amino acid.

30. The fuel cell catholyte solution of claim 1 wherein at least one of $R^9$-$R^{13}$ is selected from functional groups comprising —F, —CHO, —COCH$_3$, —COCH$_2$CH$_3$, —COCH$_2$CH$_2$COOH, —COOH, —(COOH)$_2$, —NH$_2$, —NH$_3^+$, —N(CH$_3$)$_2$, —NH(CH$_3$)$_2^+$, —N(CH$_3$)$_3^+$, —N(CH$_2$CH$_3$)$_2$, —NH(CH$_2$CH$_3$)$^+$, —N(CH$_2$CH$_3$)$_3^+$, —CH$_2$N(CH$_3$)$_2$, —CH$_2$NH(CH$_3$)$_2^+$, —CH$_2$N(CH$_3$)$_3^+$, —N-(PhNH$_3^+$)$_2$, —N-(PhCH$_2$NH$_3^+$)$_2$, —N-(PhC$_2$H$_4$NH$_3^+$)$_2$, —N-(PhSO$_3^-$)$_2$, —N-(PhCH$_2$SO$_3^-$)$_2$, —PH—N-PhNH$_3^+$)$_2$, —PH—N-(PhCH$_2$NH$_3^+$)$_2$, —PH—N-(PhC$_2$H$_4$NH$_3^+$)$_2$, —PH—N-(PhSO$_3^-$)$_2$, —PH—N-PhCH$_2$SO$_3^-$)$_2$, —PH—N-(PhC$_2$H$_4$SO$_3^-$)$_2$, —OH, —CH$_2$OH, —CH(OH)CH$_3$, OSO$_3^-$, —SO$_3^-$, —CH$_2$SO$_3^-$, —CH$_2$OSO$_3^-$, —PO(OH)$_2$, —OPO(OH)$_2$, —CO-Gly-OH, —CO-Glu-OH and —CO-Asp-OH, and alkyl, alkenyl, aryl, cycloalkyl, alkaryl alkenaryl, aralkyl, and aralkenyl groups substituted with one or more of the aforesaid functional groups.

31. The fuel cell catholyte solution of claim 1, wherein L is present and comprises an optionally substituted ring structure formed with one or both of $R^4$ and $R^8$.

* * * * *